US011070765B2

United States Patent
Gandhi et al.

(10) Patent No.: US 11,070,765 B2
(45) Date of Patent: Jul. 20, 2021

(54) METHOD AND APPARATUS FOR IN-CAMERA NIGHT LAPSE VIDEO

(71) Applicant: GoPro, Inc., San Mateo, CA (US)

(72) Inventors: Ojas Gandhi, Fremont, CA (US); Anandhakumar Chinnaiyan, Fremont, CA (US); Naveen Chinya Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 4 days.

(21) Appl. No.: 16/391,869

(22) Filed: Apr. 23, 2019

(65) Prior Publication Data

US 2020/0344442 A1    Oct. 29, 2020

(51) Int. Cl.
| | |
|---|---|
| *H04N 5/915* | (2006.01) |
| *H04N 19/51* | (2014.01) |
| *H04N 19/146* | (2014.01) |
| *H04N 19/13* | (2014.01) |
| *H04N 19/98* | (2014.01) |

(52) U.S. Cl.
CPC ............. *H04N 5/915* (2013.01); *H04N 19/13* (2014.11); *H04N 19/146* (2014.11); *H04N 19/51* (2014.11); *H04N 19/98* (2014.11)

(58) Field of Classification Search
CPC ...... H04N 5/915; H04N 19/13; H04N 19/146; H04N 19/51; H04N 19/98
USPC ........................................................ 386/326
See application file for complete search history.

(56) References Cited

U.S. PATENT DOCUMENTS

| | | | | |
|---|---|---|---|---|
| 9,423,341 | B1* | 8/2016 | Jim | B64G 3/00 |
| 2011/0229152 | A1* | 9/2011 | Hara | H04L 25/0262 |
| | | | | 398/202 |
| 2012/0194686 | A1* | 8/2012 | Lin | H04N 5/2355 |
| | | | | 348/208.4 |
| 2016/0278107 | A1* | 9/2016 | Bar Bracha | H04L 67/36 |
| 2017/0139872 | A1* | 5/2017 | Ladd | G06F 13/362 |
| 2020/0084467 | A1* | 3/2020 | Chou | H04N 19/115 |
| 2020/0357439 | A1* | 11/2020 | Akiyoshi | H04N 5/926 |

* cited by examiner

*Primary Examiner* — Loi H Tran
(74) *Attorney, Agent, or Firm* — Young Basile Hanlon & MacFarlane, P.C.

(57) ABSTRACT

A method and apparatus for night lapse video capture are disclosed. The apparatus includes an image sensor, an image processor, and a video encoder. The image sensor is configured to capture image data. The image data includes a first image that is temporally precedent to a second image. The image processor is configured to determine a motion estimation. The motion estimation is based on a comparison of a portion of the first image and a portion of the second image. The image processor is configured to subtract a mask from the second image to obtain a denoised image. The mask is based on the motion estimation. The video encoder is configured to receive the denoised image from the image processor. The video encoder is configured to encode the denoised image in a video format. The video encoder is configured to output a video file in the video format.

17 Claims, 11 Drawing Sheets

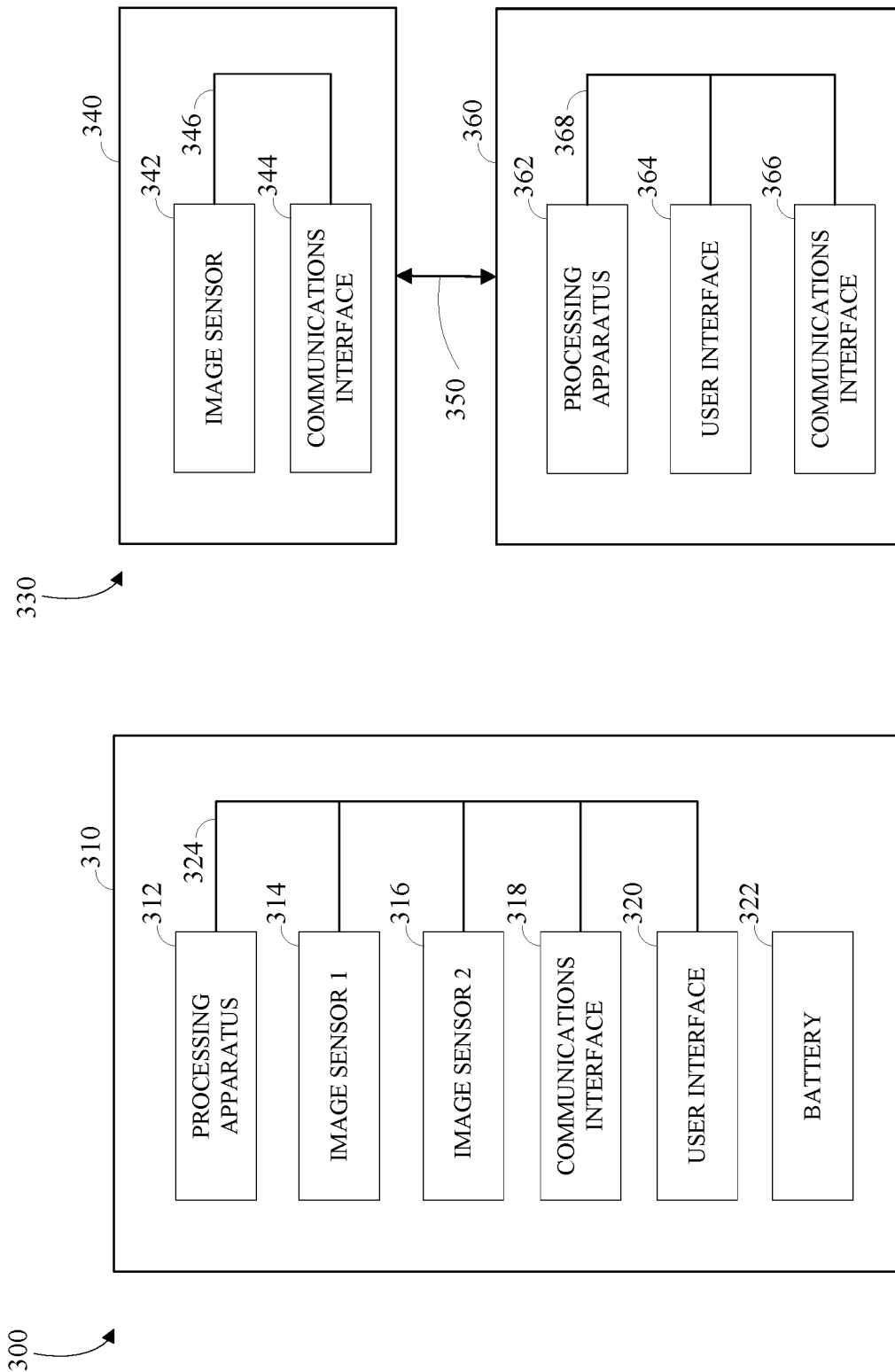

METHOD AND APPARATUS FOR IN-CAMERA NIGHT LAPSE VIDEO

TECHNICAL FIELD

This disclosure relates to digital image and video processing, including in-camera night lapse video capture.

BACKGROUND

Image capture devices, such as cameras, may capture content as images, video, or both. Typical cameras may have a night photo mode that generates photos with long shutter times, long integration times, or both, that require substantial offline processing in order to achieve a night lapse effect. Typical image capture devices do not support video modes having a long integration time, and therefore it is not possible to capture a night lapse video in-camera in real-time.

SUMMARY

Disclosed herein are implementations of in-camera night lapse video capture. An aspect of the implementations disclosed herein may include an image capture device. The image capture device may have a night exposure and a non-night exposure. A duration of the night exposure may be greater than a duration of the non-night exposure. The image capture device may include an image sensor, an image processor, and a video encoder. The image sensor may be configured to capture image data at night. The image data may include a first image that is temporally precedent to a second image. The image processor may be configured to determine a motion estimation. The motion estimation may be based on a comparison of a portion of the first image and a portion of the second image. The portion of the first image may correspond to the portion of the second image. The image processor may be configured to obtain a mask based on the motion estimation. The image processor may be configured to subtract the mask from the second image to obtain a denoised image. The video encoder may be configured to receive the denoised image from the image processor. The video encoder may be configured to encode the denoised image in a video format. The video encoder may be configured to output a video file in the video format.

An aspect may include an in-camera method for capturing night lapse video. The method may include capturing an image and a reference image. The reference image may be temporally precedent to the image. The method may include processing the image and the reference image using an image processing pipeline. The method may include denoising the image. The method may include encoding the denoised image. The denoised image may be encoded in a video format. The method may include outputting a video file in the video format.

An aspect may include an image capture device that includes an image sensor, an image processor, and a video encoder. The image sensor may be configured to capture image data. The image data may include a first image that is temporally precedent to a second image. The image processor may be configured to determine a motion estimation. The motion estimation may be based on a comparison of a portion of the first image and a portion of the second image. The portion of the first image may correspond to the portion of the second image. The image processor may be configured to subtract a mask from the second image to obtain a denoised image. The mask may be based on the motion estimation. The video encoder may be configured to receive the denoised image from the image processor. The video encoder may be configured to encode the denoised image in a video format. The video encoder may be configured to output a video file in the video format.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
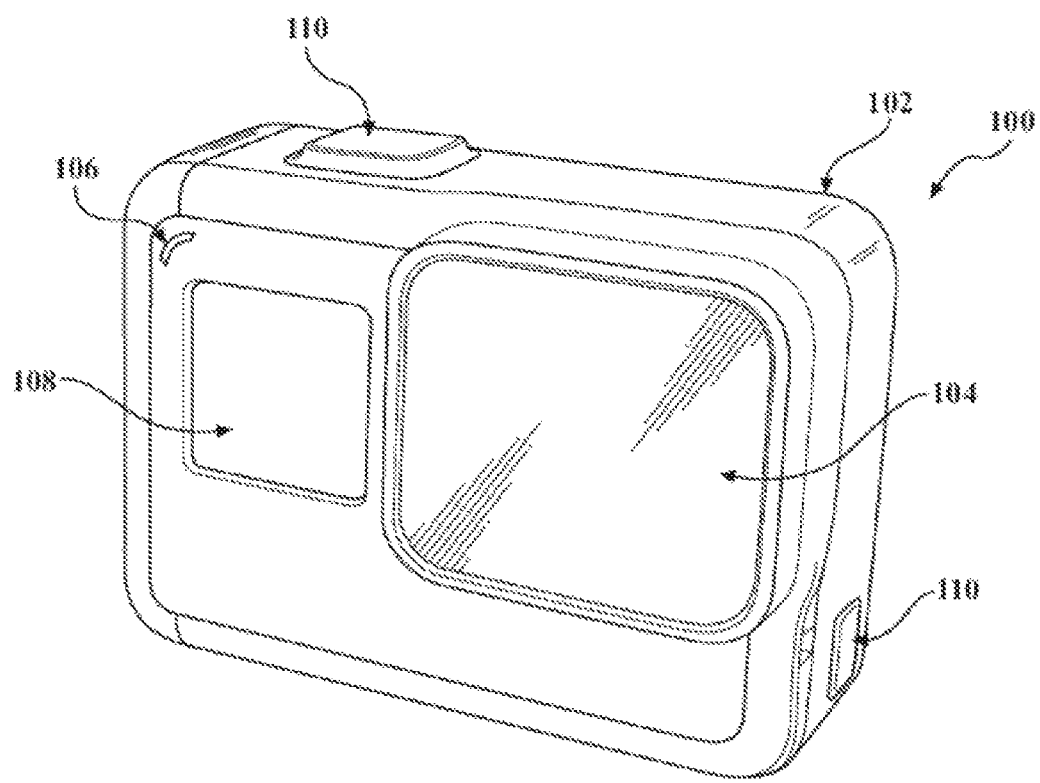
FIGS. 1A-D are isometric views of an example of an image capture device.

Implementations described herein may include an in-camera video mode that applies an image processing pipeline configured for a photo mode in conjunction with a temporal noise reduction unit and a video encoding unit. Image quality may be retained by the application of the photo mode pipeline. In the implementations described herein, the image sensors may be configured to support long integration times of 30 seconds or more for in-camera night lapse video capture. In automatic mode, the shutter time, the integration time, or both, may be set up to 10 seconds. In manual mode, the shutter time, the integration time, or both, may be set to 2 seconds, 5 seconds, 10 seconds, 15 seconds, 20 seconds, or 30 seconds. In one or more implementations described herein, the video encoder may determine a group of frames (GOP) as an intra-coded image (I-Frame) only, where an I-Frame is an image that is coded independently of all other images. In one or more implementations described herein, the video encoder may determine a GOP as an I-Frame and a predictive-coded image (P-Frame) as a function of a scene classification, where a P-Frame may include motion compensation information relative to previously decoded images. The video encoder may be configured to set a playback speed as a function of ISO, integration time, object motion, or any combination thereof. An example of object motion may be the moon moving across the sky, light painting, or driving through a city at night.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
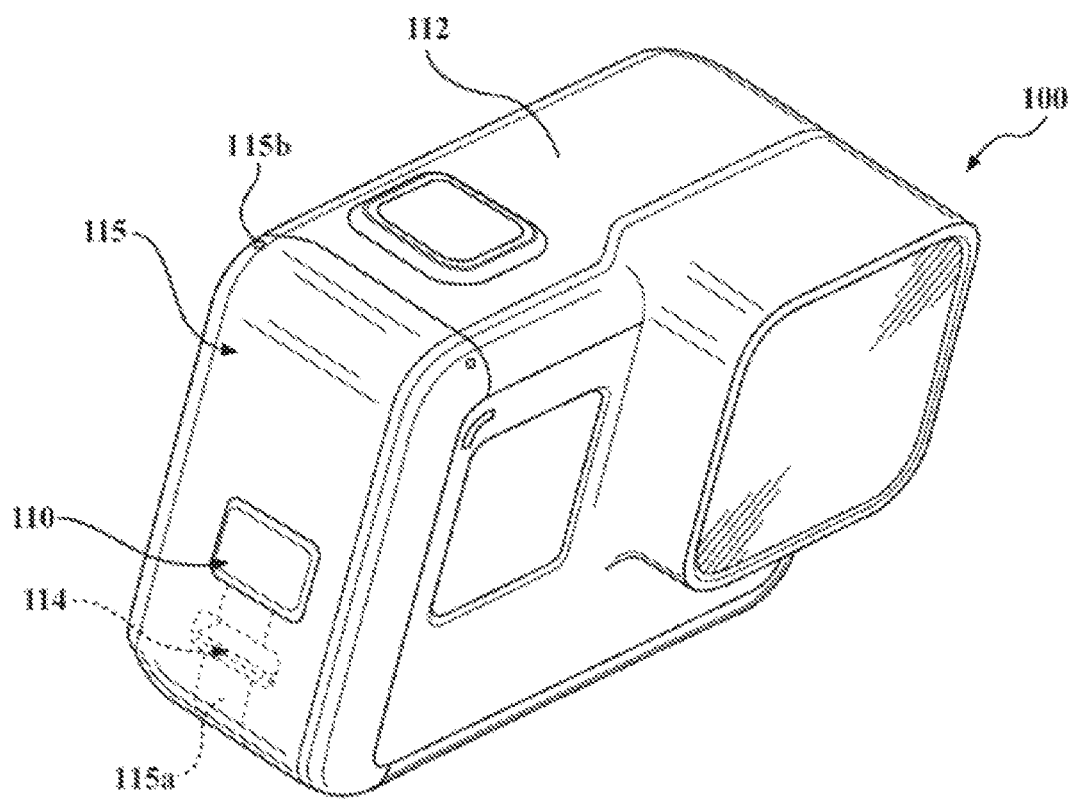
Figure 1C:
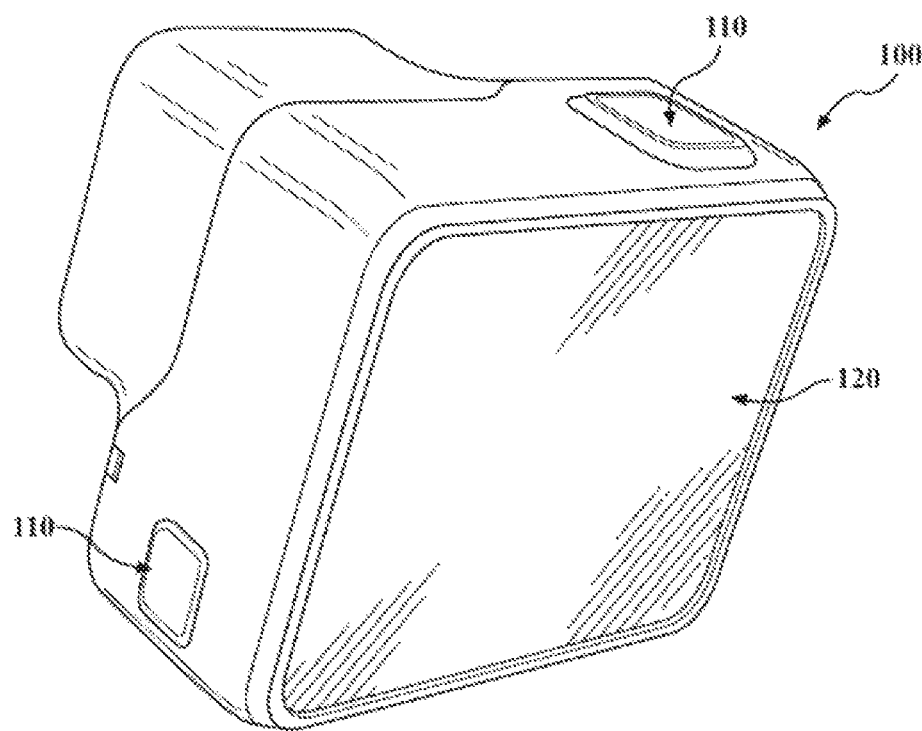
Figure 1D:
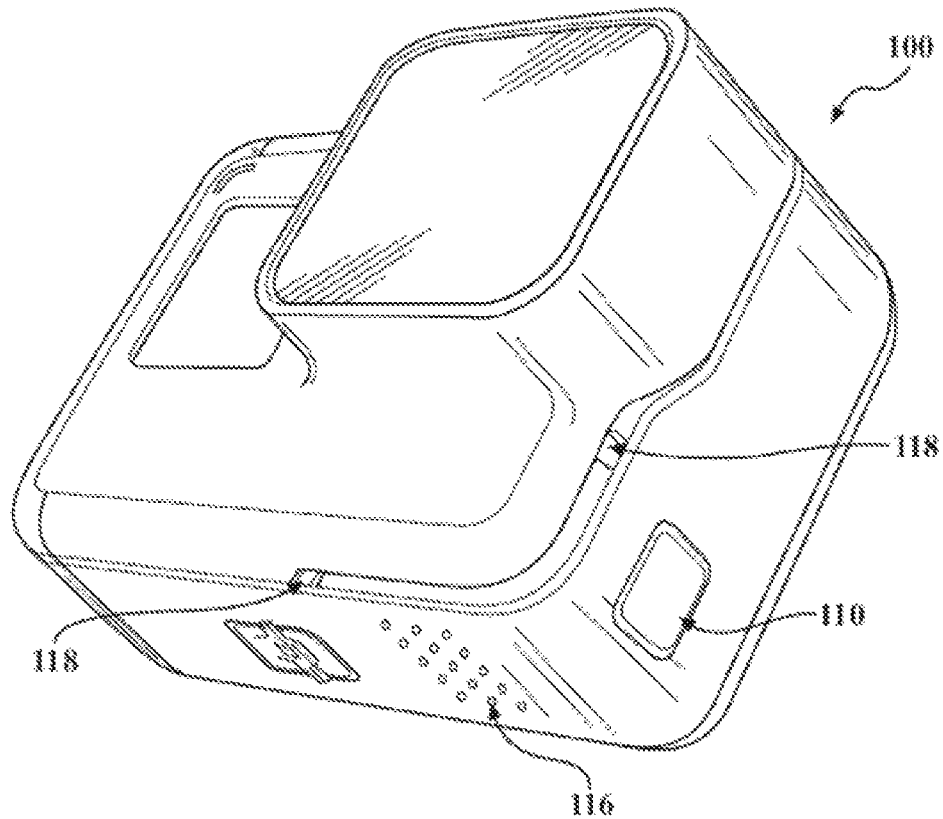

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115*a* (e.g., hidden as indicated using dotted lines) that is opened by engaging the associated button 110 as shown.

The removable door 115 can also be secured to the image capture device 100 using a hinge mechanism 115*b*, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
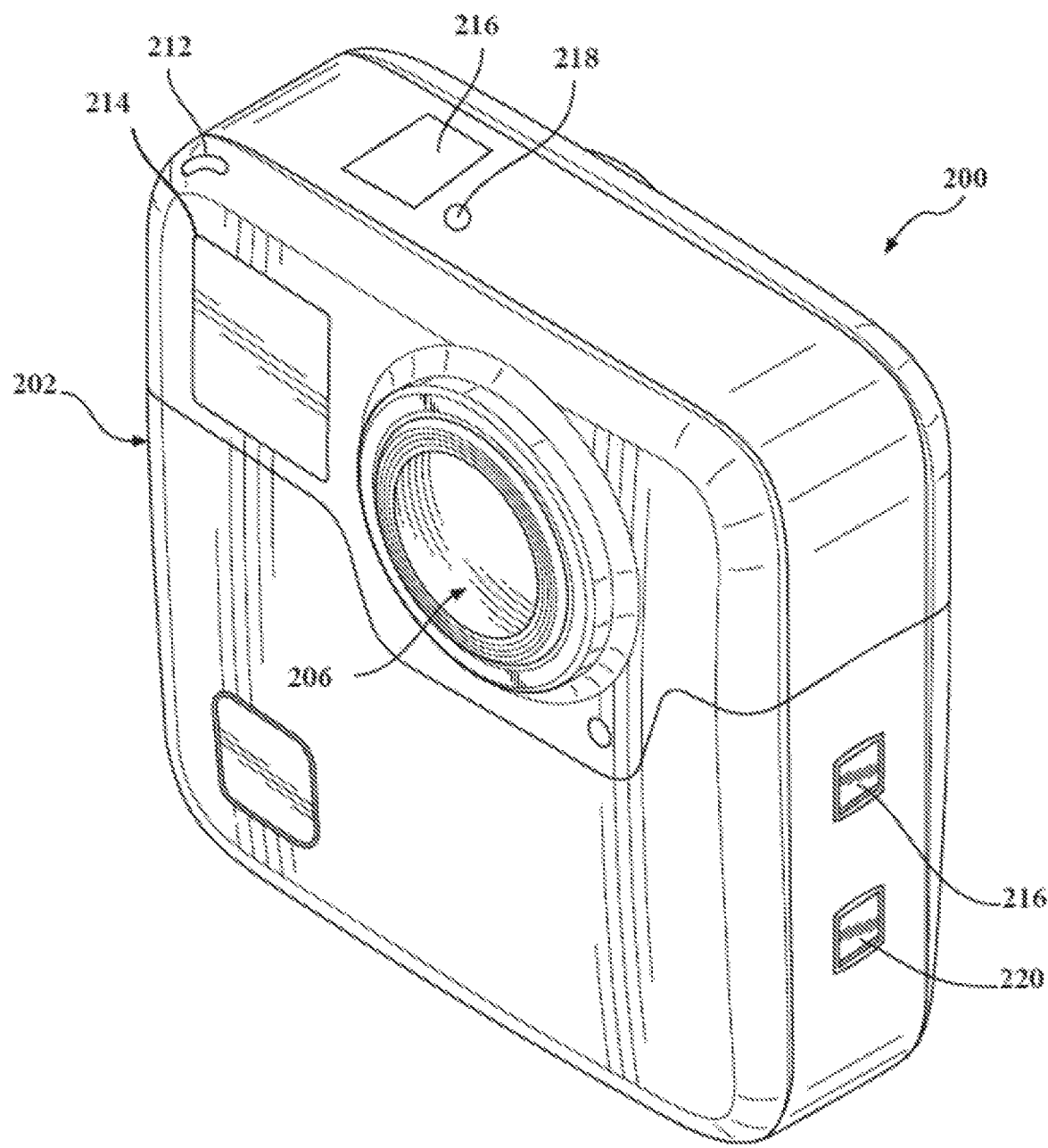
FIGS. 2A-B are isometric views of another example of an image capture device.
Figure 2B:
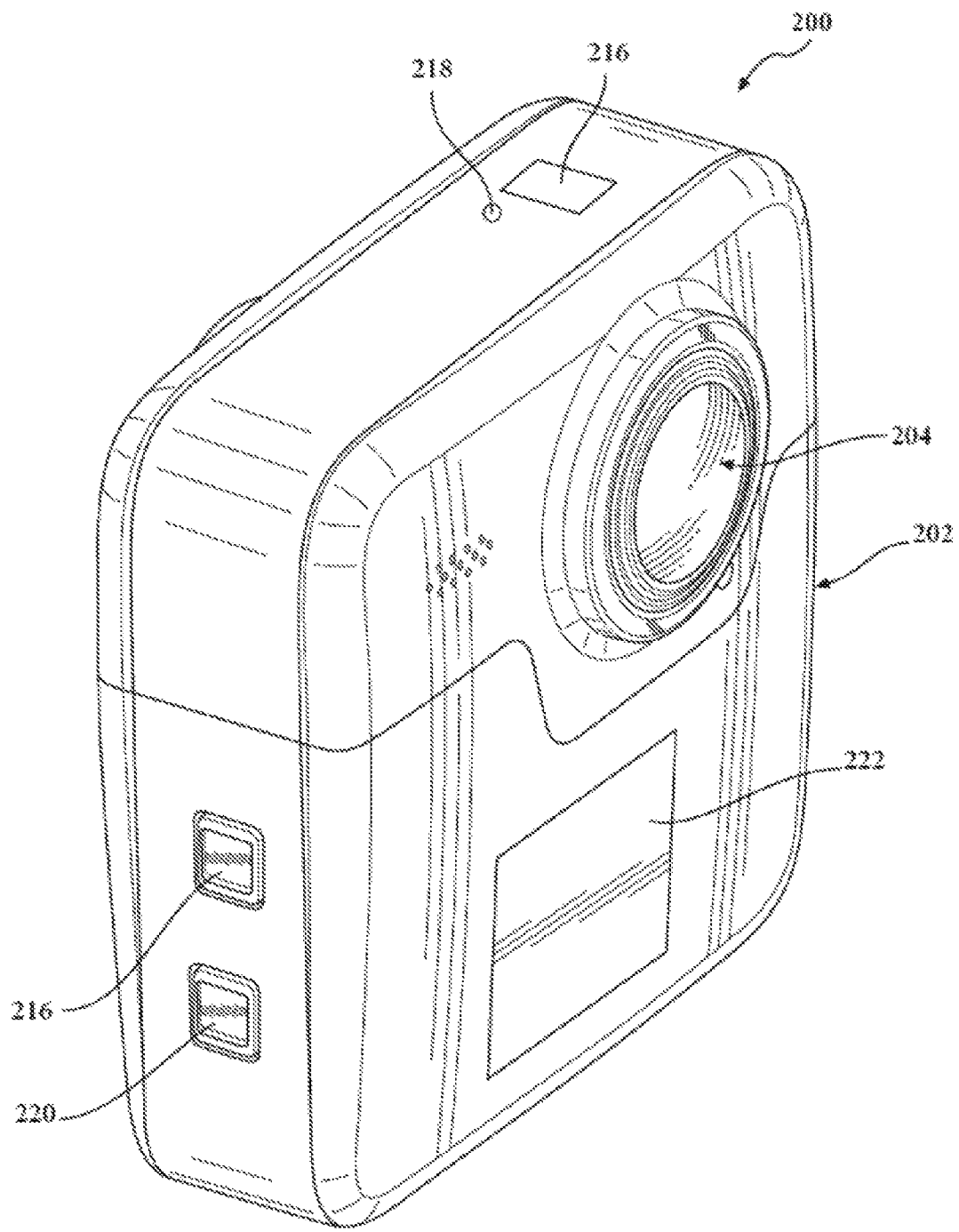

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
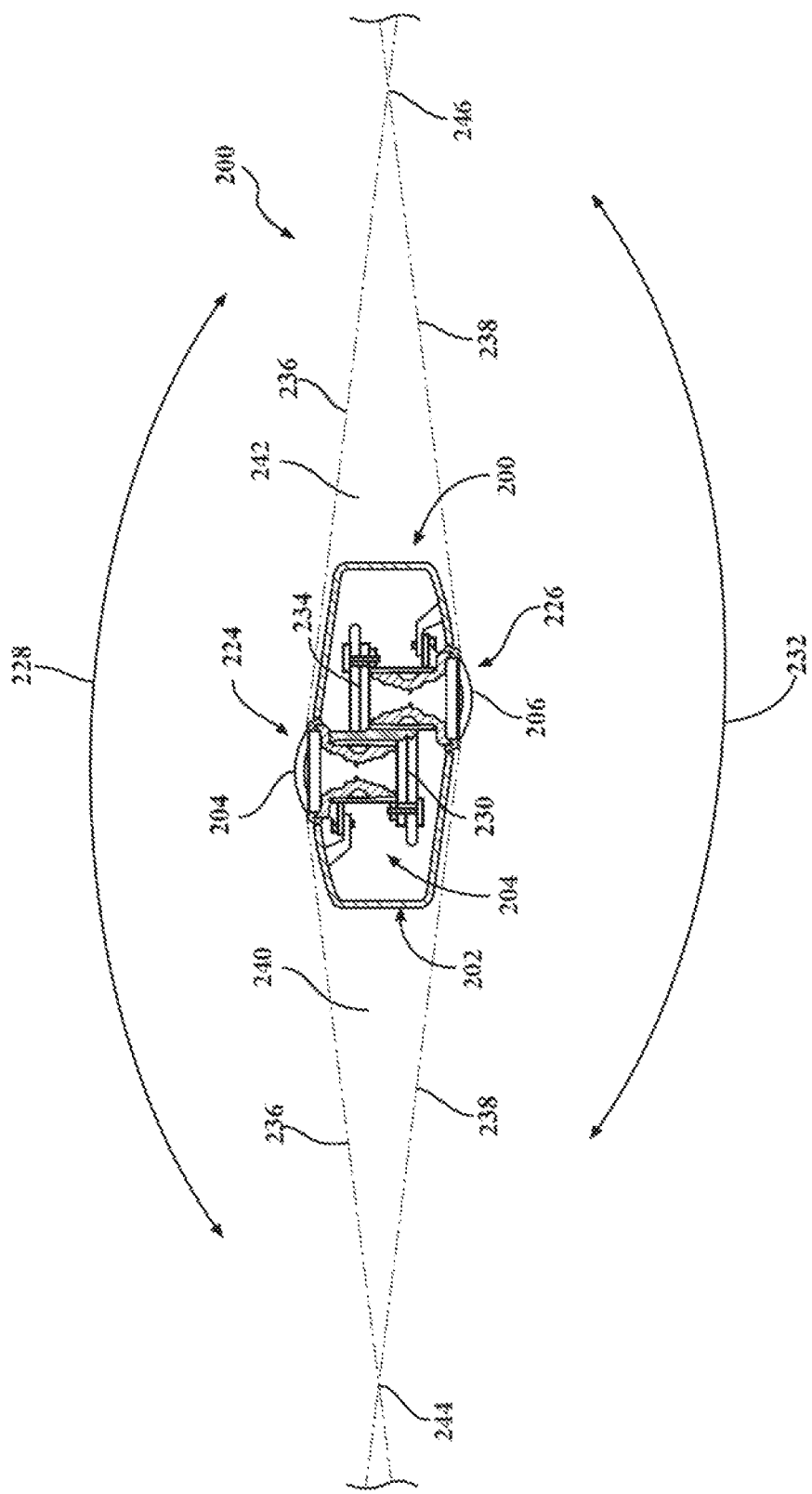
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the in-camera image processing and coding pipelines and techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the in-camera image processing and coding pipelines and techniques described in this disclosure.

Figure 4:
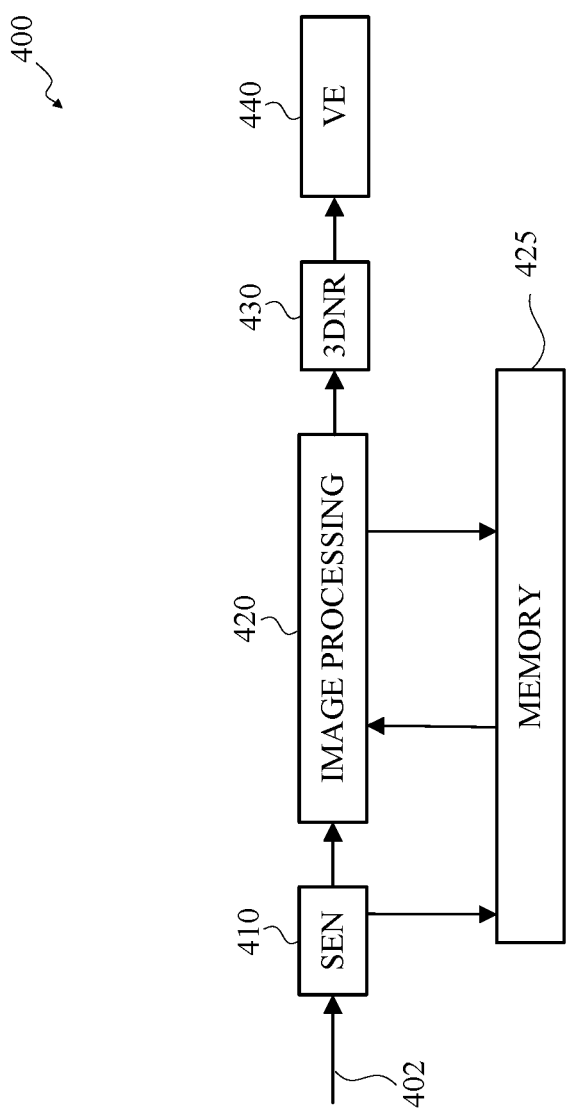
FIG. 4 is a functional block diagram of an example of an in-camera image processing and coding pipeline portion for night lapse video.

FIG. 4 is a functional block diagram of an example of an in-camera image processing and coding pipeline portion 400 for night lapse video. The image processing and coding pipeline portion 400 may be included in an image capture device, such as the image capture device 100 shown in FIGS. 1A-D, the image capture device 200 shown in FIGS. 2A-C, the image capture system 300 shown in FIG. 3A, or the image capture system 330 shown in FIG. 3B. The portion of the image processing and coding pipeline portion 400 shown in FIG. 4 may implement three-dimensional noise reduction including electronic image stabilization, which may include image quality enhancements and power efficiency enhancements for night lapse video.

The image processing and coding pipeline portion 400 may receive an image signal 402, such as from one or more image sensors (not shown), such as the image sensor 314 shown in FIG. 3A. The one or more image sensors may be configured to support an integration time of 30 seconds or more. The image signal 402 may be received as input image data. The image signal 402 may be received in a defined format, such an unsigned 14-bit Bayer format.

As shown in FIG. 4, the image processing and coding pipeline portion 400 includes a sensor input (SEN) unit 410 for receiving the image signal 402 as input image data. The sensor input unit 410 may process the input image data and may output image data.

As shown in FIG. 4, the image processing unit 420 receives the image data from the sensor input unit 410, a memory 425, or both. The image processing unit 420 may convert the received image data to an unsigned 10-bit YUV image data. The image processing unit 420 may store the unsigned 10-bit YUV image data in memory 425. The image processing unit 420 may be configured to perform any number of passes. For example, in some implementations, the image processing unit 420 may be configured to perform two or more passes.

As shown in FIG. 4, the image processing and coding pipeline portion 400 includes a temporal noise reduction unit 430. In this example, the temporal noise reduction unit 430 may be a three-dimensional noise reduction (3DNR) unit. The image processing unit 420 may output the image data to the temporal noise reduction unit 430 and the temporal noise reduction unit 430 may receive the image data from the image processing unit 420. The image data received at the temporal noise reduction unit 430 may be unsigned 10-bit YUV image data. The received image data may include one or more images. Each received image may have a corresponding reference image. The reference image may temporally precede the received image, and in some implementations, the reference image may be adjacent to and immediately precede the received image.

The temporal noise reduction unit 430 may determine a motion estimation based on a comparison of a portion of the received image and a portion of the reference image. The received image and the reference image may be divided into a number of blocks or portions, for example, each image may be divided into 16×16 blocks. The portion of the received image may correspond to the portion of the reference image such that the pixels of the portion of the received image are the same pixels of the portion of the reference image. The temporal noise reduction unit 430 may obtain motion vectors based on a comparison of the pixels of the portion of the received image with the pixels in the corresponding portion of the reference image, a time reference relative to the reference frame, or both, to determine the motion estimation. The motion estimation may identify pixels that are determined to be moving in the received image relative to the reference image. The temporal noise reduction unit 430 may obtain a mask based on the motion estimation, for example, the pixels that are identified to be moving. The temporal noise reduction unit 430 may subtract the mask from the received image to obtain a denoised image. In some implementations, the temporal noise reduction unit 430 may be configured to perform spatial noise reduction.

As shown in FIG. 4, the image processing and coding pipeline portion 400 includes a video encoder (VE) 440. The video encoder 440 may be any type of video encoder configured to encode video into any type of video format. For example, the video encoder 440 may be an advanced video coding (AVC) encoder configured to encode video into an H.264 format or a high-efficiency video coding (HEVC) encoder configured to encode video into an H.265 format. The video encoder 440 may be configured to encode the denoised image at a bitrate from about 60 Mbps to about 120 Mbps. In an example, the video encoder 440 may be configured to dynamically select a bitrate prior to the image capture, during the image capture, or both. The video encoder 440 may be configured to dynamically select the bitrate based on a function of ISO, a function of integration time, a function of a scene classification, or any combination thereof. Example scene classifications may include a night sky, a sunrise, a sunset, a cityscape, or the like.

Figure 5:
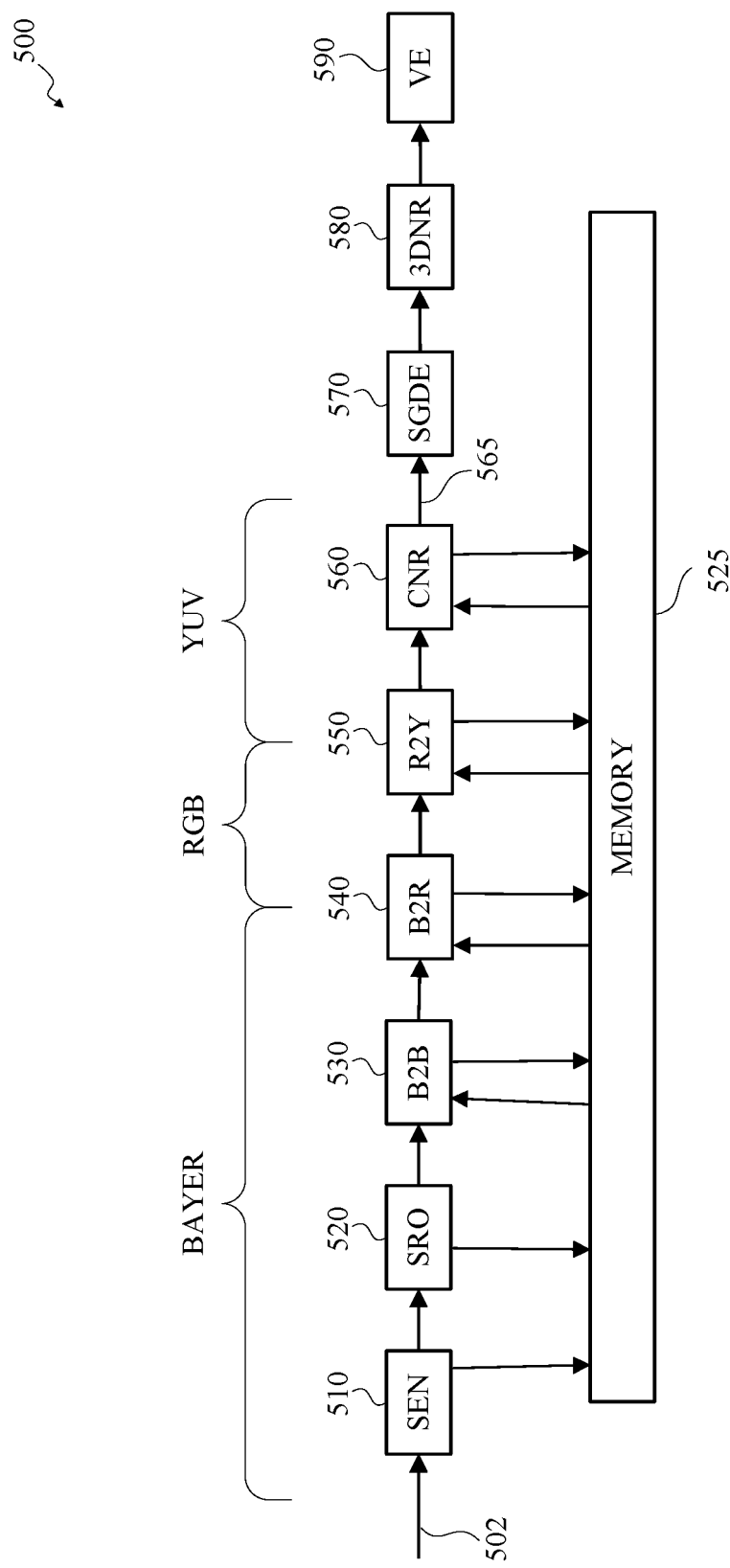
FIG. 5 is a functional block diagram of another example of an in-camera image processing and coding pipeline portion for night lapse video.

FIG. 5 is a functional block diagram of another example of an in-camera image processing and coding pipeline portion 500 for night lapse video. The image processing and coding pipeline portion 500 may be included in an image capture device, such as the image capture device 100 shown in FIGS. 1A-D, the image capture device 200 shown in FIGS. 2A-C, the image capture system 300 shown in FIG. 3A, or the image capture system 330 shown in FIG. 3B. The image processing and coding pipeline portion 500 may be similar to the image processing and coding pipelines, or pipeline portions, shown in FIG. 4, except as described herein or otherwise clear from context. The portion of the image processing and coding pipeline portion 500 shown in FIG. 5 may implement three-dimensional noise reduction including electronic image stabilization, which may include image quality enhancements and power efficiency enhancements for night lapse video.

The image processing and coding pipeline portion 500 may receive an image signal 502, such as from one or more image sensors (not shown), such as the image sensor 314 shown in FIG. 3A. The one or more image sensors may be configured to support an integration time of 30 seconds or more. The image signal 502 may be received as input image data. The image signal 502 may be received in a defined format, such an unsigned 14-bit Bayer format.

As shown in FIG. 5, the image processing and coding pipeline portion 500 includes a sensor input unit 510 for receiving the image signal 502 as input image data. The sensor input unit 510 may be similar to the sensor input unit 410 shown in FIG. 4, except as described herein or otherwise clear from context. The sensor input unit 510 may process the input image data and may output image data.

As shown in FIG. 5, the image processing and coding pipeline portion 500 includes a sensor read out unit 520. The sensor input unit 510 may output the input image data to the sensor read out unit 520 and the sensor read out unit 520 may receive the input image data from the sensor input unit 510. The sensor read out unit 520 may output the image data as 15-bit Bayer format data. The image data output by the sensor read out unit 520 may be stored in memory 525, which may include compression of the image data. The sensor read out unit 520 may be configured to perform any number of passes. For example, in some implementations, the sensor read out unit 520 may be configured to perform two or more passes.

As shown in FIG. 5, the image processing and coding pipeline portion 500 includes a Bayer-to-Bayer unit 530. The sensor read out unit 520 may output the image data to the Bayer-to-Bayer unit 530 and the Bayer-to-Bayer unit 530 may receive the image data from the sensor read out unit 520, the memory 525, or both. The Bayer-to-Bayer unit 530 may convert the 15-bit Bayer format data to the 14-bit Bayer format. The Bayer-to-Bayer unit 530 may output the image data as 14-bit Bayer format data. The image data output by the Bayer-to-Bayer unit 530 may be stored in memory 525. The Bayer-to-Bayer unit 530 may include a noise reduction unit, for example a two-dimensional noise reduction unit. The Bayer-to-Bayer unit 530 may be configured to perform any number of passes. For example, in some implementations, the Bayer-to-Bayer unit 530 may be configured to perform two or more passes.

As shown in FIG. 5, the portion of the image processing and coding pipeline portion 500 includes a Bayer-to-RGB unit 540. The Bayer-to-Bayer unit 530 may output the image data to the Bayer-to-RGB unit 540 and the Bayer-to-RGB unit 540 may receive the image data from the Bayer-to-Bayer unit 530, the memory 525, or both. The Bayer-to-RGB unit 540 may convert the image data from Bayer format to an RGB format, such as a 14-bit RGB format. The image data output by the Bayer-to-RGB unit 540 may be stored in memory 525. The Bayer-to-RGB unit 540 may include a noise reduction unit, for example a two-dimensional noise reduction unit. The Bayer-to-RGB unit 540 may be configured to perform any number of passes. For example, in some implementations, the Bayer-to-RGB unit 540 may be configured to perform two or more passes.

As shown in FIG. 5, the image processing and coding pipeline portion 500 includes an RGB-to-YUV unit 550. The Bayer-to-RGB unit 540 may output the image data to the RGB-to-YUV unit 550 and the RGB-to-YUV unit 550 may receive the image data from the Bayer-to-RGB unit 540, the memory 525, or both. The RGB-to-YUV unit 550 may convert the image data from RGB format to a YUV format, such as a 10-bit YUV format. The image data output by the RGB-to-YUV unit 550 may be stored in memory 525. The RGB-to-YUV unit 550 may be configured to perform any number of passes. For example, in some implementations, the RGB-to-YUV unit 550 may be configured to perform two or more passes.

As shown in FIG. 5, the image processing and coding pipeline portion 500 includes a Chroma Noise Reduction unit 560. The RGB-to-YUV unit 550 may output the image data to the Chroma Noise Reduction unit 560 and the Chroma Noise Reduction unit 560 may receive the image data from the RGB-to-YUV unit 550, the memory 525, or both. The image data received at the Chroma Noise Reduction unit 560 may be unsigned 10-bit YUV image data. The Chroma Noise Reduction unit 560 may output partially processed image data as indicated at 565. The Chroma Noise Reduction unit 560 may be configured to perform any number of passes. For example, in some implementations, the Chroma Noise Reduction unit 560 may be configured to perform two or more passes.

As shown in FIG. 5, the image processing and coding pipeline portion 500 includes a smart geometrical distortion engine (SGDE) 570. The SGDE 570 is configured to correct distortions such as warping caused by sensor tilt, lens barrel distortion, or both. The Chroma Noise Reduction unit 560 may output the image data to the SGDE 570 and the SGDE 570 may receive the image data from the Chroma Noise Reduction unit 560. The image data received at the SGDE 570 may be unsigned 10-bit YUV image data.

As shown in FIG. 5, the image processing and coding pipeline portion 500 includes a temporal noise reduction unit 580. In this example, the temporal noise reduction unit 580 may be a three-dimensional noise reduction unit. The SGDE 570 may output the image data to the temporal noise reduction unit 580 and the temporal noise reduction unit 580 may receive the image data from the SGDE 570. The image data received at the temporal noise reduction unit 580 may be unsigned 10-bit YUV image data. The received image data may include one or more images. Each received image may have a corresponding reference image. The reference image may temporally precede the received image, and in some implementations, the reference image may be adjacent to and immediately precede the received image.

The temporal noise reduction unit 580 may determine a motion estimation based on a comparison of a portion of the received image and a portion of the reference image. The received image and the reference image may be divided into a number of blocks or portions, for example, each image may be divided into 16×16 blocks. The portion of the received image may correspond to the portion of the reference image such that the pixels of the portion of the received image are the same pixels of the portion of the reference image. The temporal noise reduction unit 580 may obtain motion vectors based on a comparison of the pixels of the portion of the received image with the pixels in the corresponding portion of the reference image, a time reference relative to the reference frame, or both, to determine the motion estimation. The motion estimation may identify pixels that are determined to be moving in the received image relative to the reference image. The temporal noise reduction unit 580 may obtain a mask based on the motion estimation, for example, the pixels that are identified to be moving. The temporal noise reduction unit 580 may subtract the mask from the received image to obtain a denoised image. In some implementations, the temporal noise reduction unit 580 may be configured to perform spatial noise reduction.

As shown in FIG. 5, the image processing and coding pipeline portion 500 includes a video encoder 590. The video encoder 590 may be any type of video encoder configured to encode video into any type of video format. For example, the video encoder 590 may be an AVC encoder configured to encode video into an H.264 format or an HEVC encoder configured to encode video into an H.265 format. The video encoder 590 may be configured to encode the denoised image at a bitrate from about 60 Mbps to about 120 Mbps. In an example, the video encoder 590 may be configured to dynamically select a bitrate prior to the image capture, during the image capture, or both. The video encoder 590 may be configured to dynamically select the bitrate based on a function of ISO, a function of integration time, a function of a scene classification, or any combination thereof. Example scene classifications may include a night sky, a sunrise, a sunset, a cityscape, or the like.

Figure 6:
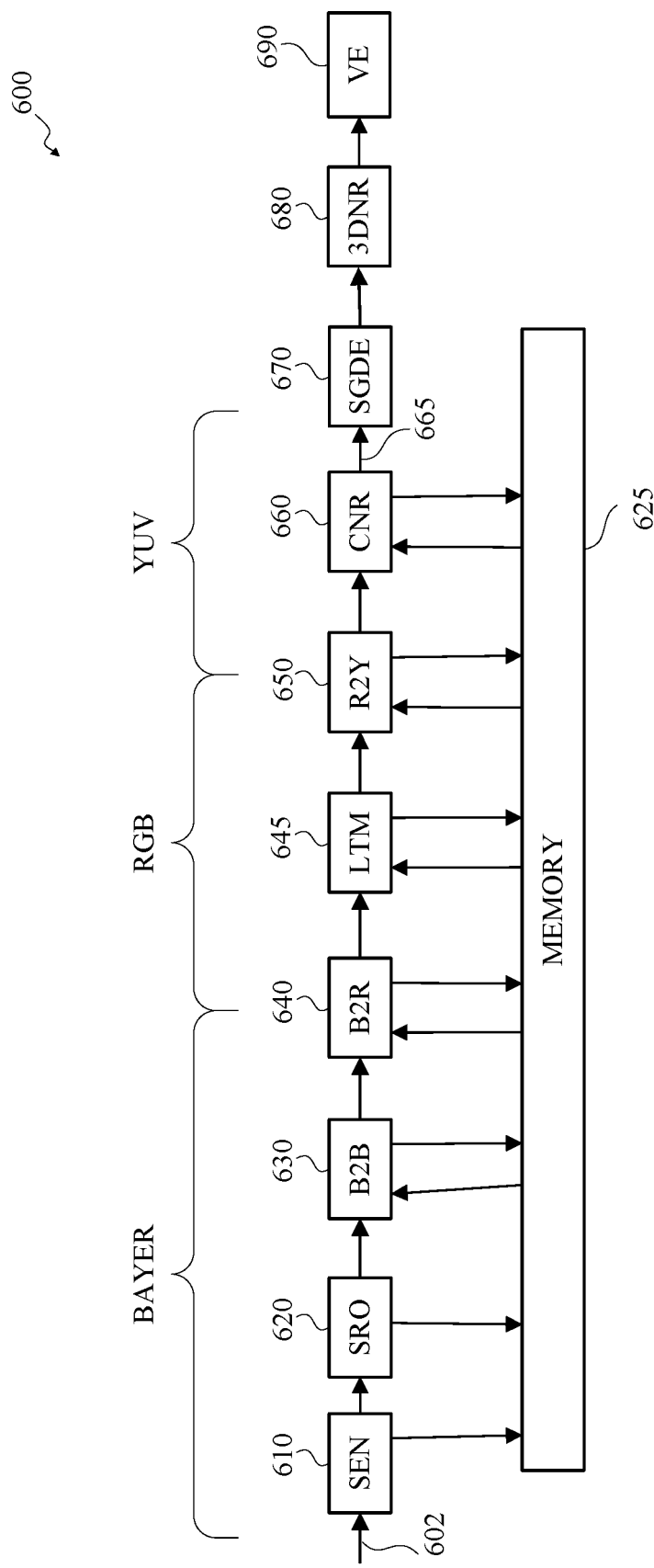
FIG. 6 is a functional block diagram of another example of an in-camera image processing and coding pipeline portion for night lapse video.

FIG. 6 is a functional block diagram of another example of an in-camera image processing and coding pipeline portion 600 for night lapse video. The image processing and coding pipeline portion 600 may be included in an image capture device, such as the image capture device 100 shown in FIGS. 1A-D, the image capture device 200 shown in FIGS. 2A-C, the image capture system 300 shown in FIG. 3A, or the image capture system 330 shown in FIG. 3B. The image processing and coding pipeline portion 600 may be similar to the image processing and coding pipelines, or pipeline portions, shown in FIG. 4, except as described herein or otherwise clear from context. The portion of the image processing and coding pipeline portion 600 shown in FIG. 6 may implement local tone mapping and three-dimensional noise reduction including electronic image stabilization, which may include image quality enhancements and power efficiency enhancements for night lapse video.

The image processing and coding pipeline portion 600 may receive an image signal 602, such as from one or more image sensors (not shown), such as the image sensor 314 shown in FIG. 3A. The one or more image sensors may be configured to support an integration time of 30 seconds or more. The image signal 602 may be received as input image data. The image signal 602 may be received in a defined format, such an unsigned 14-bit Bayer format.

As shown in FIG. 6, the image processing and coding pipeline portion 600 includes a sensor input unit 610 for receiving the image signal 602 as input image data. The sensor input unit 610 may be similar to the sensor input unit 410 shown in FIG. 4, except as described herein or otherwise clear from context. The sensor input unit 610 may process the input image data and may output image data.

As shown in FIG. 6, the image processing and coding pipeline portion 600 includes a sensor read out unit 620. The sensor input unit 610 may output the input image data to the sensor read out unit 620 and the sensor read out unit 620 may receive the input image data from the sensor input unit 610. The sensor read out unit 620 may output the image data as 15-bit Bayer format data. The image data output by the sensor read out unit 620 may be stored in memory 625, which may include compression of the image data. The sensor read out unit 620 may be configured to perform any number of passes. For example, in some implementations, the sensor read out unit 620 may be configured to perform two or more passes.

As shown in FIG. 6, the image processing and coding pipeline portion 600 includes a Bayer-to-Bayer unit 630. The sensor read out unit 620 may output the image data to the Bayer-to-Bayer unit 630 and the Bayer-to-Bayer unit 630 may receive the image data from the sensor read out unit 620, the memory 625, or both. The Bayer-to-Bayer unit 630 may convert the 15-bit Bayer format data to the 14-bit Bayer format. The Bayer-to-Bayer unit 630 may output the image data as 14-bit Bayer format data. The image data output by the Bayer-to-Bayer unit 630 may be stored in memory 625. The Bayer-to-Bayer unit 630 may include a noise reduction unit, for example a two-dimensional noise reduction unit. The Bayer-to-Bayer unit 630 may be configured to perform any number of passes. For example, in some implementations, the Bayer-to-Bayer unit 630 may be configured to perform two or more passes.

As shown in FIG. 6, the portion of the image processing and coding pipeline portion 600 includes a Bayer-to-RGB unit 640. The Bayer-to-Bayer unit 630 may output the image data to the Bayer-to-RGB unit 640 and the Bayer-to-RGB unit 640 may receive the image data from the Bayer-to-Bayer unit 630, the memory 625, or both. The Bayer-to-RGB unit 640 may convert the image data from Bayer format to an RGB format, such as a 14-bit RGB format. The image data output by the Bayer-to-RGB unit 640 may be stored in memory 625. The Bayer-to-RGB unit 640 may include a noise reduction unit, for example a two-dimensional noise reduction unit. The Bayer-to-RGB unit 640 may be configured to perform any number of passes. For example, in some implementations, the Bayer-to-RGB unit 640 may be configured to perform two or more passes.

As shown in FIG. 6, the image processing and coding pipeline portion 600 includes a Local Tone Mapping (LTM) unit 645. The Bayer-to-RGB unit 640 may output the image data to the Local Tone Mapping unit 645 and the Local Tone Mapping unit 645 may receive the image data from the Bayer-to-RGB unit 640, the memory 625, or both. The Local Tone Mapping unit 645 may perform local tone mapping for wide dynamic range (WDR) images. The Local Tone Mapping unit 645 may be configured to perform any number of passes. For example, in some implementations, the Local Tone Mapping unit 645 may be configured to perform two or more passes.

As shown in FIG. 6, the image processing and coding pipeline portion 600 includes an RGB-to-YUV unit 650. The Local Tone Mapping unit 645 may output the image data to the RGB-to-YUV unit 650 and the RGB-to-YUV unit 650 may receive the image data from the Local Tone Mapping unit 645, the memory 625, or both. The RGB-to-YUV unit 650 may convert the image data from RGB format to a YUV format, such as a 10-bit YUV format. The image data output by the RGB-to-YUV unit 650 may be stored in memory 625. The RGB-to-YUV unit 650 may be configured to perform any number of passes. For example, in some implementations, the RGB-to-YUV unit 650 may be configured to perform two or more passes.

As shown in FIG. 6, the image processing and coding pipeline portion 600 includes a Chroma Noise Reduction unit 660. The RGB-to-YUV unit 650 may output the image data to the Chroma Noise Reduction unit 660 and the Chroma Noise Reduction unit 660 may receive the image data from the RGB-to-YUV unit 650, the memory 625, or both. The image data received at the Chroma Noise Reduction unit 660 may be unsigned 10-bit YUV image data. The Chroma Noise Reduction unit 660 may output partially processed image data as indicated at 665. The Chroma Noise Reduction unit 660 may be configured to perform any number of passes. For example, in some implementations, the Chroma Noise Reduction unit 660 may be configured to perform two or more passes.

As shown in FIG. 6, the image processing and coding pipeline portion 600 includes a smart geometrical distortion engine (SGDE) 670. The SGDE 670 is configured to correct distortions such as warping caused by sensor tilt, lens barrel distortion, or both. The Chroma Noise Reduction unit 660 may output the image data to the SGDE 670 and the SGDE 670 may receive the image data from the Chroma Noise Reduction unit 660. The image data received at the SGDE 670 may be unsigned 10-bit YUV image data.

As shown in FIG. 6, the image processing and coding pipeline portion 600 includes a temporal noise reduction unit 680. In this example, the temporal noise reduction unit 680 may be a 3DNR unit. The SGDE 670 may output the image data to the temporal noise reduction unit 680 and the temporal noise reduction unit 680 may receive the image data from the SGDE 670. The image data received at the temporal noise reduction unit 680 may be unsigned 10-bit YUV image data. The received image data may include one or more images. Each received image may have a corresponding reference image. The reference image may temporally precede the received image, and in some implementations, the reference image may be adjacent to and immediately precede the received image.

The temporal noise reduction unit 680 may determine a motion estimation based on a comparison of a portion of the received image and a portion of the reference image. The received image and the reference image may be divided into a number of blocks or portions, for example, each image may be divided into 16×16 blocks. The portion of the received image may correspond to the portion of the reference image such that the pixels of the portion of the received image are the same pixels of the portion of the reference image. The temporal noise reduction unit 680 may obtain motion vectors based on a comparison of the pixels of the portion of the received image with the pixels in the corresponding portion of the reference image, a time reference relative to the reference frame, or both, to determine the motion estimation. The motion estimation may identify pixels that are determined to be moving in the received image relative to the reference image. The temporal noise reduction unit 680 may obtain a mask based on the motion estimation, for example, the pixels that are identified to be moving. The temporal noise reduction unit 680 may subtract the mask from the received image to obtain a denoised image. In some implementations, the temporal noise reduction unit 680 may be configured to perform spatial noise reduction.

As shown in FIG. 6, the image processing and coding pipeline portion 600 includes a video encoder 690. The video encoder 690 may be any type of video encoder configured to encode video into any type of video format. For example, the video encoder 690 may be an AVC encoder configured to encode video into an H.264 format or an HEVC encoder configured to encode video into an H.265 format. The video encoder 690 may be configured to encode the denoised image at a bitrate from about 60 Mbps to about 120 Mbps. In an example, the video encoder 690 may be configured to dynamically select a bitrate prior to the image capture, during the image capture, or both. The video encoder 690 may be configured to dynamically select the bitrate based on a function of ISO, a function of integration time, a function of a scene classification, or any combination thereof. Example scene classifications may include a night sky, a sunrise, a sunset, a cityscape, or the like.

Figure 7:
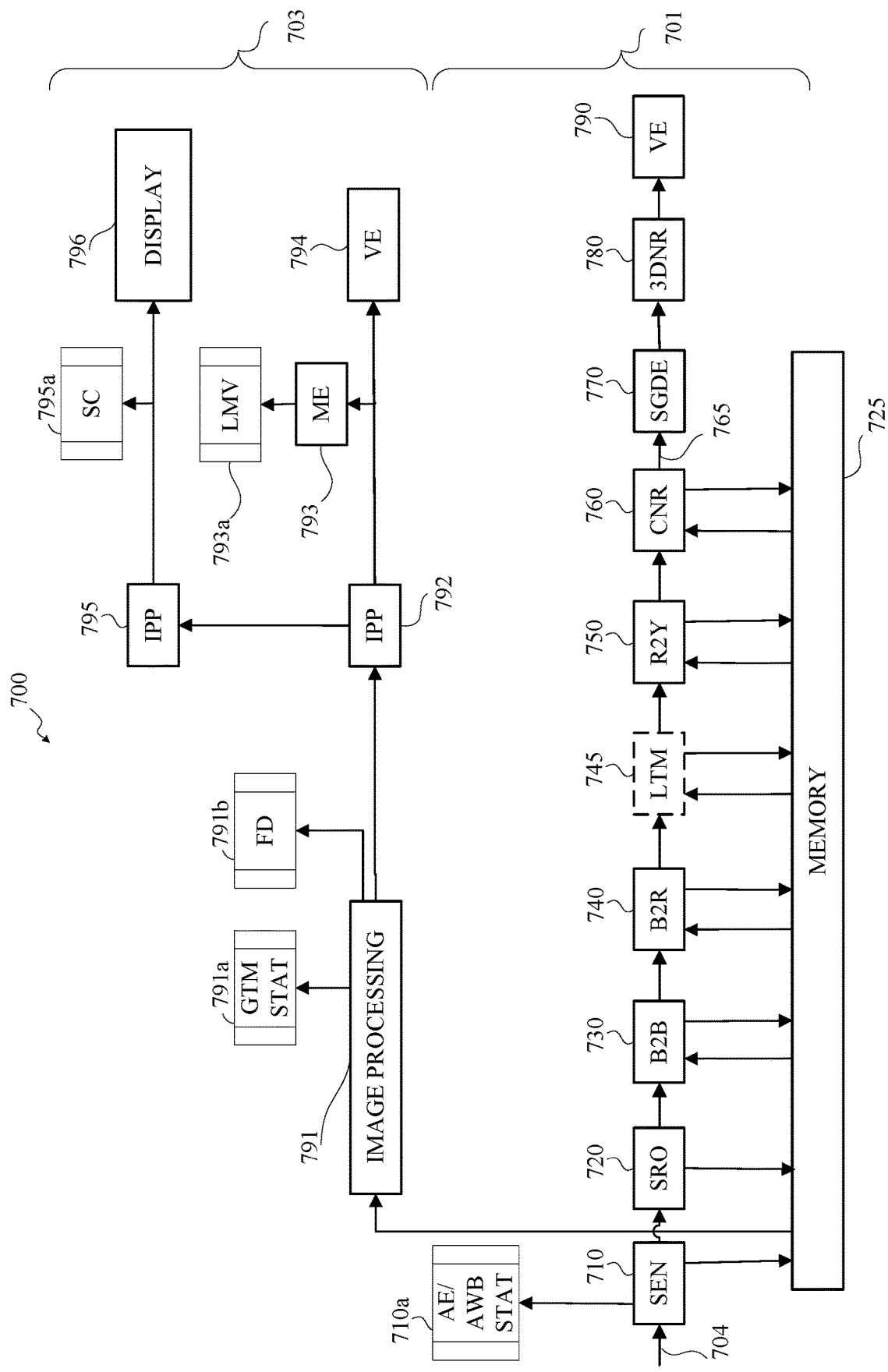
FIG. 7 is a functional block diagram of an example of an in-camera video processing and coding pipeline with real-time video preview.

FIG. 7 is a functional block diagram of an example of an in-camera video processing and coding pipeline with real-time video preview. The image processing and coding pipeline portion 700 may be included in an image capture device, such as the image capture device 100 shown in FIGS. 1A-D, the image capture device 200 shown in FIGS. 2A-C, the image capture system 300 shown in FIG. 3A, or the image capture system 330 shown in FIG. 3B. The image processing and coding pipeline portion 700 includes an image processing portion 701 and a video preview portion 703. The image processing portion 701 of the image processing and coding pipeline portion 700 may be similar to the image processing and coding pipelines, or pipeline portions, shown in FIG. 4, except as described herein or otherwise clear from context. The portion of the image processing and coding pipeline portion 700 shown in FIG. 7 may implement local tone mapping and three-dimensional noise reduction including electronic image stabilization, which may include image quality enhancements and power efficiency enhancements for night lapse video.

The image processing and coding pipeline portion 700 may receive an image signal 704, such as from one or more image sensors (not shown), such as the image sensor 314 shown in FIG. 3A. The one or more image sensors may be configured to support an integration time of 30 seconds or more. The image signal 704 may be received as input image data. The input image signal 704 may be received in a defined format, such an unsigned 14-bit Bayer format.

As shown in FIG. 7, the image processing portion 701 includes a sensor input unit 710 for receiving the image signal 704 as input image data. The sensor input unit 710 may be similar to the sensor input unit 410 shown in FIG. 4, except as described herein or otherwise clear from context. The sensor input unit 710 may process the input image data and may output image data.

As shown in FIG. 7, the image processing portion 701 includes a sensor read out unit 720. The sensor input unit 710 may output the input image data to the sensor read out unit 720 and the sensor read out unit 720 may receive the input image data from the sensor input unit 710. The sensor read out unit 720 may output the image data as 15-bit Bayer format data. The image data output by the sensor read out unit 720 may be stored in memory 725, which may include compression of the image data. The sensor read out unit 720 may be configured to perform any number of passes. For example, in some implementations, the sensor read out unit 720 may be configured to perform two or more passes. The image data may be used to compute statistics 710*a*, for example auto-exposure (AE) statistics, auto-white balance (AWB) statistics, or both.

As shown in FIG. 7, the image processing portion 701 includes a Bayer-to-Bayer unit 730. The sensor read out unit 720 may output the image data to the Bayer-to-Bayer unit 730 and the Bayer-to-Bayer unit 730 may receive the image data from the sensor read out unit 720, the memory 725, or both. The Bayer-to-Bayer unit 730 may convert the 15-bit Bayer format data to the 14-bit Bayer format. The Bayer-to-Bayer unit 730 may output the image data as 14-bit Bayer format data. The image data output by the Bayer-to-Bayer unit 730 may be stored in memory 725. The Bayer-to-Bayer unit 730 may include a noise reduction unit, for example a two-dimensional noise reduction unit. The Bayer-to-Bayer unit 730 may be configured to perform any number of passes. For example, in some implementations, the Bayer-to-Bayer unit 730 may be configured to perform two or more passes.

As shown in FIG. 7, the portion of the image processing portion 701 includes a Bayer-to-RGB unit 740. The Bayer-to-Bayer unit 730 may output the image data to the Bayer-to-RGB unit 740 and the Bayer-to-RGB unit 740 may receive the image data from the Bayer-to-Bayer unit 730, the memory 725, or both. The Bayer-to-RGB unit 740 may convert the image data from Bayer format to an RGB format, such as a 14-bit RGB format. The image data output by the Bayer-to-RGB unit 740 may be stored in memory 725. The Bayer-to-RGB unit 740 may include a noise reduction unit, for example a two-dimensional noise reduction unit. The Bayer-to-RGB unit 740 may be configured to perform any number of passes. For example, in some implementations, the Bayer-to-RGB unit 740 may be configured to perform two or more passes.

As shown in FIG. 7, the image processing portion 701 includes a Local Tone Mapping unit 745. The Local Tone Mapping unit 745 is shown in a dashed line to indicate that some implementations may not include the Local Tone Mapping unit 745. The Bayer-to-RGB unit 740 may output the image data to the Local Tone Mapping unit 745 and the Local Tone Mapping unit 745 may receive the image data from the Bayer-to-RGB unit 740, the memory 725, or both. The Local Tone Mapping unit 745 may perform local tone mapping for wide dynamic range (WDR) images. The Local Tone Mapping unit 745 may be configured to perform any number of passes. For example, in some implementations, the Local Tone Mapping unit 745 may be configured to perform two or more passes.

As shown in FIG. 7, the image processing portion 701 includes an RGB-to-YUV unit 750. The Local Tone Mapping unit 745 may output the image data to the RGB-to-YUV unit 750 and the RGB-to-YUV unit 750 may receive the image data from the Local Tone Mapping unit 745, the memory 725, or both. The RGB-to-YUV unit 750 may convert the image data from RGB format to a YUV format, such as a 10-bit YUV format. The image data output by the RGB-to-YUV unit 750 may be stored in memory 725. The RGB-to-YUV unit 750 may be configured to perform any number of passes. For example, in some implementations, the RGB-to-YUV unit 750 may be configured to perform two or more passes.

As shown in FIG. 7, the image processing portion 701 includes a Chroma Noise Reduction unit 760. The RGB-to-YUV unit 750 may output the image data to the Chroma Noise Reduction unit 760 and the Chroma Noise Reduction unit 760 may receive the image data from the RGB-to-YUV unit 750, the memory 725, or both. The image data received at the Chroma Noise Reduction unit 760 may be unsigned 10-bit YUV image data. The Chroma Noise Reduction unit 760 may output partially processed image data as indicated at 765. The Chroma Noise Reduction unit 760 may be configured to perform any number of passes. For example, in some implementations, the Chroma Noise Reduction unit 760 may be configured to perform two or more passes.

As shown in FIG. 7, the image processing portion 701 includes a smart geometrical distortion engine (SGDE) 770. The SGDE 770 is configured to correct distortions such as warping caused by sensor tilt, lens barrel distortion, or both. The Chroma Noise Reduction unit 760 may output the image data to the SGDE 770 and the SGDE 770 may receive the image data from the Chroma Noise Reduction unit 760. The image data received at the SGDE 770 may be unsigned 10-bit YUV image data.

As shown in FIG. 7, the image processing portion 701 includes a temporal noise reduction unit 780. In this example, the temporal noise reduction unit 780 may be a 3DNR unit. The SGDE 770 may output the image data to the temporal noise reduction unit 780 and the temporal noise reduction unit 780 may receive the image data from the SGDE 770. The image data received at the temporal noise reduction unit 780 may be unsigned 10-bit YUV image data. The received image data may include one or more images. Each received image may have a corresponding reference image. The reference image may temporally precede the received image, and in some implementations, the reference image may be adjacent to and immediately precede the received image.

The temporal noise reduction unit 780 may determine a motion estimation based on a comparison of a portion of the received image and a portion of the reference image. The received image and the reference image may be divided into a number of blocks or portions, for example, each image may be divided into 16×16 blocks. The portion of the received image may correspond to the portion of the reference image such that the pixels of the portion of the received image are the same pixels of the portion of the reference image. The temporal noise reduction unit 780 may obtain motion vectors based on a comparison of the pixels of the portion of the received image with the pixels in the corresponding portion of the reference image, a time reference relative to the reference frame, or both, to determine the motion estimation. The motion estimation may identify pixels that are determined to be moving in the received image relative to the reference image. The temporal noise reduction unit 780 may obtain a mask based on the motion estimation, for example, the pixels that are identified to be moving. The temporal noise reduction unit 780 may subtract the mask from the received image to obtain a denoised image. In some implementations, the temporal noise reduction unit 780 may be configured to perform spatial noise reduction.

As shown in FIG. 7, the image processing portion 701 includes a video encoder 790. The video encoder 790 may be any type of video encoder configured to encode video into any type of video format. For example, the video encoder 790 may be an AVC encoder configured to encode video into an H.264 format or an HEVC encoder configured to encode video into an H.265 format. The video encoder 790 may be configured to encode the denoised image at a bitrate from about 60 Mbps to about 120 Mbps. In an example, the video encoder 790 may be configured to dynamically select a bitrate prior to the image capture, during the image capture, or both. The video encoder 790 may be configured to dynamically select the bitrate based on a function of ISO, a function of integration time, a function of a scene classification, or any combination thereof. Example scene classifications may include a night sky, a sunrise, a sunset, a cityscape, or the like.

As shown in FIG. 7, the video preview portion 703 includes an image processing unit 791 that performs the functions of the sensor readout unit 720, the Bayer-to-Bayer unit 730, the Bayer-to-RGB unit 740, the RGB-to-YUV unit 750, and the chroma noise reduction unit 760. The image processing unit 791 may be configured to perform any number of passes. For example, in some implementations, the image processing unit 791 may be configured to perform two or more passes. The output of the image processing unit 791 may be used to compute statistics 791*a*, for example global tone mapping (GTM) statistics. The output of the image processing unit 791 may be used to perform face detection (FD) 791*b*. The output of the image processing unit 791 is sent to an integrated performance primitive (IPP) unit 792. The IPP unit 792 receives the output from the image processing unit 791 and performs a warping correction, image stabilization, or both. The output of the IPP unit 792 may be sent to a motion estimation (ME) unit 793. The motion estimation unit 793 may perform motion estimation as described above. The output from the motion estimation unit 793 may be used to calculate one or more local motion vectors (LMV)s 793*a*. The output of the IPP unit 792 may be sent to a video encoder 794. The video encoder 794 may receive and process the output of the IPP unit 792 using AVC or HEVC to output a preview video for display on the image capture device in real-time during a night lapse video capture.

The output of the IPP unit 792 may be sent to an IPP unit 795. The IPP unit 795 receives the output of the IPP unit 792 and rasterizes and rotates the image data based on an orientation of the image capture device. The output of the IPP unit 795 may be sent to the display 796 of the image capture device or a high-definition multi-media interface (HDMI) for display. The output of the IPP unit 795 may be used to determine a scene classification 795*a*.

Figure 8:
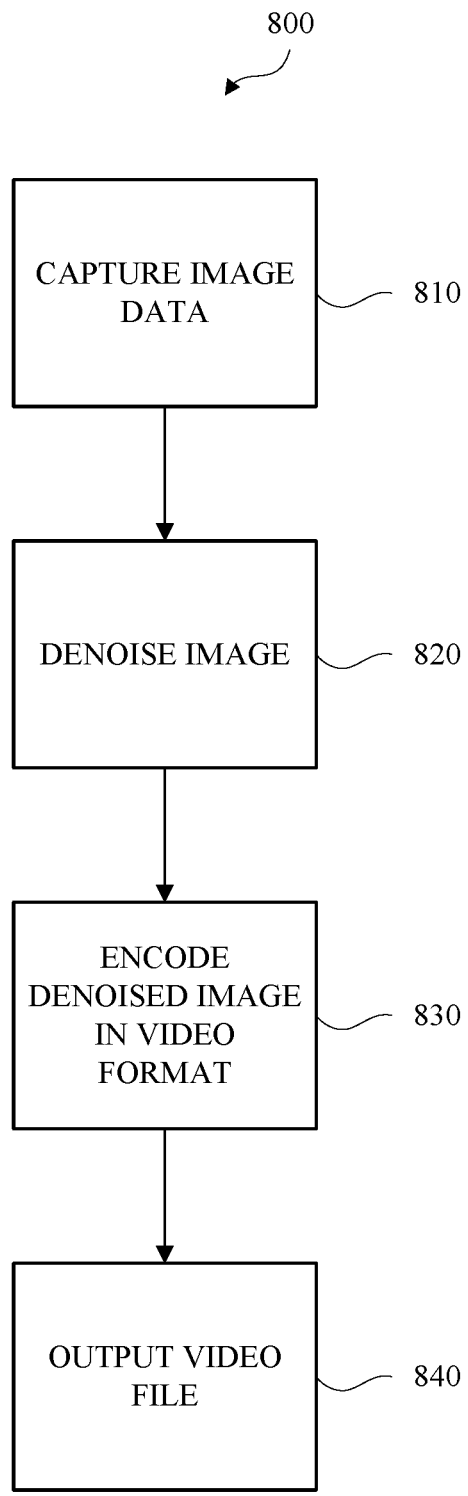
FIG. 8 is a flow diagram of an in-camera video processing method for night lapse video.

FIG. 8 is a flow diagram of an in-camera video processing method 800 for night lapse video. The method may include capturing 810 image data, denoising 820 an image, encoding 830 the denoised image, and outputting 840 a video file.

Referring to FIG. 8, capturing 810 image data may include capturing an image. Capturing 810 image data may include capturing a reference image that is temporally precedent to the image. In an example, there may be a one-frame delay between the image and the reference image. The reference image may be a frame that is immediately preceding the image. In some examples, the reference image may precede the image by two or more frames. The image and the reference image may be processed using an image processing pipeline.

Processing the image, the reference image, or both, using an image processing pipeline may include converting a 15-bit Bayer image to a 14-bit Bayer image. Processing the image, the reference image, or both, using an image processing pipeline may include converting the 14-bit Bayer image to a 14-bit RGB image. Processing the image, the reference image, or both, using an image processing pipeline may include converting the 14-bit RGB image to a 10-bit YUV image. Processing the image, the reference image, or both, using an image processing pipeline may include performing chroma denoising of the 10-bit YUV image. Processing the image, the reference image, or both, using an image processing pipeline may include performing a warp correction of the 10-bit YUV image.

Denoising 820 the image, the reference image, or both, may include determining a motion estimation. The motion estimation may be based on a comparison of a portion of the image and a corresponding portion of the reference image. Denoising 820 the image, the reference image, or both, may include obtaining a mask based on the motion estimation. Denoising 820 the image, the reference image, or both, may include subtracting the mask from the image to obtain a denoised image.

Encoding 830 the denoised image may include encoding the denoised image in a video file in an AVC format. Encoding 830 the denoised image may include encoding the denoised image in a video file in an HEVC format. The denoised image may be encoded at a bitrate from about 60 Mbps to about 120 Mbps. The bitrate may be dynamically selected prior to the image capture or during the image capture.

Outputting 840 the video file may include storing the video file in a memory. Outputting 840 the video file may include displaying the video on a display of the image capture device. Outputting 840 the video file may include transmitting the video file for display on a remote device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   an image sensor configured to capture image data at night, wherein the image data includes a first image that is temporally precedent to a second image;
   an image processor configured to:
   determine a motion estimation based on a comparison of a portion of the first image and a portion of the second image, wherein the portion of the first image corresponds to the portion of the second image;
   obtain a mask based on the motion estimation; and
   subtract the mask from the second image to obtain a denoised image; and
   a video encoder configured to:

dynamically select a bitrate based on an ISO setting of the image capture device prior to an image capture or during the image capture;
receive the denoised image from the image processor;
encode the denoised image in a video format; and
output a video file in the video format.

2. The image capture device of claim 1, wherein the image sensor is further configured to support an integration time of 30 seconds or more.

3. The image capture device of claim 1, wherein the video encoder is an advanced video coding (AVC) encoder or a high-efficiency video coding (HEVC) encoder.

4. The image capture device of claim 1, wherein the video encoder is configured to encode the denoised image at a bitrate from about 60 Mbps to about 120 Mbps.

5. The image capture device of claim 1, wherein the video encoder is further configured to dynamically select the bitrate based on an integration time.

6. The image capture device of claim 1, wherein the video encoder is further configured to dynamically select the bitrate based on a function of a scene classification.

7. The image capture device of claim 6, wherein the scene classification is a night sky, a sunrise, or a sunset.

8. An image capture device comprising:
an image sensor configured to capture image data, wherein the image data includes a first image that is temporally precedent to a second image;
an image processor configured to:
determine a motion estimation based on a comparison of a portion of the first image and a portion of the second image, wherein the portion of the first image corresponds to the portion of the second image; and
subtract a mask from the second image to obtain a denoised image, wherein the mask is based on the motion estimation; and
a video encoder configured to:
dynamically select a bitrate based on an ISO setting of the image capture device prior to an image capture or during the image capture;
receive the denoised image from the image processor;
encode the denoised image in a video format; and
output a video file in the video format.

9. The image capture device of claim 8, wherein the video encoder is an advanced video coding (AVC) encoder or a high-efficiency video coding (HEVC) encoder.

10. The image capture device of claim 8, wherein the video encoder is further configured to dynamically select the bitrate based on an integration time.

11. The image capture device of claim 8, wherein the video encoder is further configured to dynamically select the bitrate based on a function of a scene classification.

12. A method for use by an image capture device, the method comprising:
capturing image data that includes a first image that is temporally precedent to a second image;
determining a motion estimation based on a comparison of a portion of the first image and a portion of the second image, wherein the portion of the first image corresponds to the portion of the second image;
subtracting a mask from the second image to obtain a denoised image, wherein the mask is based on the motion estimation;
dynamically selecting a bitrate based on an ISO setting of the image capture device prior to an image capture or during the image capture;
encoding the denoised image in a video format; and
outputting a video file in the video format.

13. The method of claim 12, wherein the encoding is an advanced video coding (AVC) or a high-efficiency video coding (HEVC).

14. The method of claim 12, wherein the denoised image is encoded at a bitrate from about 60 Mbps to about 120 Mbps.

15. The method of claim 12, wherein dynamically selecting the bitrate is based on an integration time.

16. The method of claim 12, wherein dynamically selecting the bitrate is based on a function of a scene classification.

17. The method of claim 16, wherein the scene classification is a night sky, a sunrise, or a sunset.

* * * * *